US010593997B2

(12) United States Patent
Fitter (10) Patent No.: US 10,593,997 B2
(45) Date of Patent: Mar. 17, 2020

(54) METAL ACCUMULATION INHIBITING AND PERFORMANCE ENHANCING SUPPLEMENT AND A SYSTEM FOR DELIVERING THE SUPPLEMENT

(71) Applicant: Johan C. Fitter, London (GB)

(72) Inventor: Johan C. Fitter, London (GB)

(*) Notice: Subject to any disclaimer, the term of this patent is extended or adjusted under 35 U.S.C. 154(b) by 90 days.

(21) Appl. No.: 15/977,332

(22) Filed: May 11, 2018

(65) Prior Publication Data
US 2018/0261888 A1 Sep. 13, 2018

Related U.S. Application Data

(63) Continuation of application No. 14/291,118, filed on May 30, 2014.
(Continued)

(51) Int. Cl.
*H01M 10/08* (2006.01)
*H01M 2/16* (2006.01)
(Continued)

(52) U.S. Cl.
CPC ......... *H01M 10/08* (2013.01); *H01M 2/0262* (2013.01); *H01M 2/1653* (2013.01);
(Continued)

(58) Field of Classification Search
CPC .. H01M 10/08; H01M 10/12; H01M 10/4235; H01M 10/42; H01M 2/1686;
(Continued)

(56) References Cited

U.S. PATENT DOCUMENTS 761,345 A 5/1904 Willard
1,243,368 A 10/1917 Willard
(Continued)

FOREIGN PATENT DOCUMENTS

GB 482740 A 4/1938

OTHER PUBLICATIONS

Tristam ("The Phosphatides of Hevea Brasiliensis". British Rubber Producers' Research Ass. 1942. 400-405).*
(Continued)

*Primary Examiner* — Stephen J Yanchuk
(74) *Attorney, Agent, or Firm* — Nath, Goldberg & Meyer; Joshua B. Goldberg (57) ABSTRACT

The invention relates to a metal accumulation inhibiting and performance enhancing isolated or synthesized supplement for use in or in association with rechargeable electrochemical energy storage cells, and a system for delivering the supplement including articles of plastic, articles containing plastic, articles similar to plastic, plastic containers, apparatus, porous electrodes, liquids and electrolytes, in particular, articles, apparatus, electrodes, insolating sheets, liquids and electrolytes associated with rechargeable electrochemical energy storage cells incorporating one or more supplements. An effective amount of the supplement typically exhibits foaming of an electrolyte, providing a visual indicator of activity in attenuating metal deposition on, and thereby reducing metal accumulation on, various surfaces in the rechargeable electrochemical storage cell.

4 Claims, 6 Drawing Sheets

Related U.S. Application Data (60) Provisional application No. 61/829,517, filed on May 31, 2013.

(51) Int. Cl.
*H01M 10/42* (2006.01)
*H01M 2/02* (2006.01)
*H01M 10/12* (2006.01)

(52) U.S. Cl.
CPC ......... *H01M 2/1686* (2013.01); *H01M 10/12* (2013.01); *H01M 10/4235* (2013.01); *H01M 2220/20* (2013.01); *H01M 2300/0005* (2013.01); *H01M 2300/0011* (2013.01)

(58) Field of Classification Search
CPC ............. H01M 2/0262; H01M 2/1653; H01M 2300/0011; H01M 2300/0005; H01M 2220/20
See application file for complete search history.

(56) References Cited

U.S. PATENT DOCUMENTS

| | | | |
|---|---|---|---|
| 1,243,370 | A | 10/1917 | Willard |
| 2,112,529 | A | 3/1938 | Hazell |
| 2,120,281 | A | 6/1938 | Hunt |
| 2,772,322 | A | 11/1956 | Witt et al. |
| 3,123,654 | A | 3/1964 | Malischewski |
| 3,351,495 | A | 11/1967 | Larsen et al. |
| 3,383,248 | A | 5/1968 | Badgley et al. |
| 3,933,525 | A | 1/1976 | Palmer et al. |
| 4,153,760 | A | 5/1979 | Sundberg et al. |
| 4,213,815 | A | 7/1980 | Goldberg et al. |
| 4,224,393 | A | 9/1980 | Feinberg et al. |
| 4,327,164 | A | 4/1982 | Feinberg et al. |
| 4,501,793 | A | 2/1985 | Sarada |
| 5,154,988 | A | 10/1992 | Choi et al. |
| 5,221,587 | A | 6/1993 | Bohnstedt et al. |
| 5,626,873 | A | 5/1997 | Weiner et al. |
| 6,242,127 | B1 | 6/2001 | Paik et al. |
| 6,458,491 | B1 | 10/2002 | Wimberly et al. |
| 6,485,867 | B1 | 11/2002 | Navarrete et al. |
| 6,635,387 | B2 * | 10/2003 | Fitter ............... H01M 10/4235 429/149 |
| 6,821,681 | B2 | 11/2004 | Fitter |
| 6,899,978 | B2 | 5/2005 | Fitter |
| 7,238,744 | B2 | 7/2007 | Yaritz et al. |
| 7,417,972 | B2 | 8/2008 | Dillinger et al. |
| 7,498,369 | B2 | 3/2009 | Whear et al. |
| 2002/0102674 | A1 * | 8/2002 | Anderson ............... A61F 2/14 435/174 |
| 2005/0005890 | A1 | 3/2005 | Navarrete |
| 2011/0031862 | A1 | 12/2011 | Ho et al. |
| 2012/0009418 | A1 | 4/2012 | Deiters et al. |
| 2012/0027011 | A1 | 10/2012 | Waterhouse et al. |
| 2013/0146521 | A1 * | 6/2013 | Brozell ............... B01D 67/0048 210/259 |

OTHER PUBLICATIONS

Syng L. Paik, "The Influence of Rubber Separators on Electrochemical Behavior of Lead-Acid Batteries", Battery Conference on Applications and Advabces, 1996., Eleventh Annual Digital Object Identifier: 10.1109/BCAA. 1996.485011 Publication Year: 1996, pp. 287-291.

Syng L. Paik, Glovanni Terzaghi, "Rubber separator for tomorrow: performance characteristics and selection guide" Journal of Power Source, vol. 53, Issue 2, Feb. 1995, pp. 283-287.

Rick Wimberly, Jamie Miller, George Brilmyer, "Evaluation of hybrid rubber-polyethylene industrial battery separators" Journal of Power Sources, vol. 95, Issues 1-2, Mar. 15, 2001, pp. 293-299.

Jitladda Tangpakdee Sakdapipanich "Structural characterization of natural rubber based on recent evidence from selective enzymatic treatments" Journal of Bioscience and Bioengineering, vol. 103, Issue 4, Apr. 2007, pp. 287-292.

Jitladda T. Sakdapipanich, Prontip Rojruthai, "Molecular Structure of Natural Rubber and Its Characteristics Based on Recent Evidence", Biotechnology-Molecular Studies and Novel Applications for Improved Quality of Human Life, Prof. Reda Sammour (Ed.), Intech, pp. 213-238, Published online Mar. 14, 2012.

* cited by examiner

METAL ACCUMULATION INHIBITING AND PERFORMANCE ENHANCING SUPPLEMENT AND A SYSTEM FOR DELIVERING THE SUPPLEMENT

CROSS REFERENCE TO RELATED APPLICATIONS

This is a Continuation Application of U.S. patent application Ser. No. 14/291,118, filed May 30, 2014, which application claims priority in U.S. Provisional Patent application No. 61/829,517, filed 31 May 2013, the disclosures of each of which are incorporated herein in their entirety by reference.

FIELD OF THE INVENTION

The invention relates to a metal accumulation inhibiting and performance enhancing supplement, and a system for delivering the supplement. The invention includes supplemented articles of plastic, articles containing plastic, articles similar to plastic, plastic containers, apparatus, porous electrodes, liquids and electrolytes, for use in or in association with rechargeable electrochemical energy storage cells, in particular, articles, apparatus, electrodes, liquids and electrolytes incorporating one or more supplements. The supplements of the invention are characterized by a facility to engender foaming of electrolytes as a visual indicator of activity in attenuating metal deposition on and thereby reducing metal accumulation on various surfaces in the storage cell, such as at negative electrodes thereof. In particular, the supplemented article which is the subject to the present application is a porous insulator typically disposed between the positive and negative electrodes of an electrochemical cell. These are structures which are ionically porous but are made of a dielectric material so as to prevent short circuiting between the electrodes.

BACKGROUND TO THE INVENTION

Rechargeable electrochemical energy storage cells housed in plastic enclosures have become very common. They have $PbO_2$-positive and Pb-negative electrodes at full state of charge, the electrodes surrounded by dilute $H_2SO_4$ electrolyte. Physical contact between the electrodes is prevented by a suitable form of porous insulation. There are approximately one billion six-cell configurations in use worldwide, predominantly for starting automobile engines. There are numerous other cell configurations based on essentially the same chemistry, that are used to power indoor and outdoor electric vehicles, telephone exchanges, home, office and industrial equipment, computers, servers, in load leveling applications as well as signaling and lighting applications, etc.

User complaints include a variety of difficulties that are commonly encountered in operation of these rechargeable energy storage cells and a useful service life that is too often unpredictable and limited. More specifically, as the energy storage cells of the type used to power vehicles age, their end-of-charge voltage falls, rate of gassing increases, temperature and water consumptions rise. The cells are subject to the cumulative erosive effect of charging current, in normal use, that progressively damages the integral metal support structures of the positive electrodes, resulting in disengagement of the $PbO_2$ of the positive electrodes from the support structures and, consequently, progressive loss of energy storage capacity of the cells, eventually rendering the cells unfit for normal use.

Comprehensive descriptions of elements and compounds that feature in the present specification including compounds including the elements Ba, C, Cd, Cu, H, K, N, O, Pb, S, Sb, Sn are provided in "CRC Handbook of Chemistry and Physics", Editor David R Lide, 83rd Edition, (2002-2003), Section 4, chapter 1.

BRIEF DESCRIPTION OF THE PRIOR ART

The damaging effect of charging current on the positive electrode support structures has traditionally been curtailed by alloying the metal used in their construction, using from about 1 to 12 wt % Sb, typically using 2.75 wt % Sb and the balance mainly Pb. A higher percentage Sb provides higher durability of the energy storage cells but also significantly higher water consumption.

A significant disadvantage of Pb—Sb alloy is the propensity of the Sb to be dissolved out of the support structures of the positive electrodes and to electroplate onto the active lead (Pb) of the negative electrodes, where the arriving Sb forms tiny electrolytic cells with the resident Pb. This causes the Pb to be converted into $PbSO_4$ and hydrogen gas to evolve from the Sb, progressively discharging the negative electrodes. This effect is known in the trade as Sb "poisoning".

The damaging effect of charging current has also been curtailed by imposing a limit on the maximum charging voltage. This can have undesirable effects, including what is believed to be a buildup of permanent $PbSO_4$ in the electrodes, making it difficult, even impossible to recharge the energy storage cells, when the cells have been used infrequently.

A large number of performance enhancing aids, designed to counteract the disclosed, as well as other perceived limitations and undesirable properties, have been proposed for and used in rechargeable energy storage cells for almost a century. The overwhelming majority are well known in the industry and require no elaboration, except to confirm that they failed to satisfactorily address the most common and therefore primary user complaint, limited service life.

The service life expectancy benchmark has remained unchanged for leisure grade energy storage cells at 800 shallow cycles, industrial grade at 1500 deep cycles, for many decades.

Satisfactory performance has been attained in the construction of shallow cycling and deep cycling energy storage cells which include a processed and cured form of a natural cis-polyisoprene thermoset elastomer obtained from *Hevea brasiliensis* trees. This particular thermoset elastomer is combined principally with a special form of high porosity silica and, optionally, a variety of other materials, then extruded and cured, to produce high porosity insulating sheets that are used to provide separation between energy storage cell electrodes.

It is believed that certain compounds that are naturally present in the elastomer migrate extremely slowly into electrolyte and react in a way that provides attenuation of Sb "poisoning" of negative electrodes and attenuation of dendritic growth, as well as providing other benefits including an increase in end-of-charge voltage, as well as reductions in the rate of gassing, in temperature and in water consumption, as well as an apparent increase in the useful service life of the energy storage cells, although the significance of this last named advantage appears to have been overlooked by manufacturers.

A beneficial electrochemical attenuation effect of the elastomer has been confirmed by researchers in this field through the use of cyclic voltammetry performed on electrolyte containing an extract, obtained by heating a sample of processed and cured elastomer in water or dilute $H_2SO_4$. The identity of the portion providing attenuation and the mechanism responsible for attenuation has reportedly remained unknown. In fact, efforts to identify any particular compound associated with natural thermoset elastomer have not been successful. For example, in U.S. Pat. No. 5,221,587 to Böhnstedt et al, it is stated that that: "The mechanism is unknown and it is not possible to fully explain the success of the invention." (col. 2, I. 45-50; col. 3, I. 66-67).

In U.S. Patent Publication no. 20120270110, dated Oct. 25, 2012, to Waterhouse et al, it is stated that "The exact nature of the active ingredient in the cured [thermoset elastomer] particle is not known . . . " (Para. 0024).

In another document which discusses the effects of natural thermoset elastomer on metal accumulation, it is stated " . . . the mechanism related to the ability of natural [thermoset elastomer] to suppress the effects of [Sb] . . . (is) . . . not well understood." (an evaluation of hybrid natural thermoset elastomer-polyethylene articles compared to polyethylene alone and natural thermoset elastomer alone, see www.mplp.com/TechSheets/cellforce.pdf, page 3). This document seeks to obtain the advantages of natural thermoset elastomer by blending natural thermoset elastomer with polyethylene, with some limited success. Interestingly, it is stated also that "Historically several methods which have included additions of chemical additives . . . or special coatings have been attempted to mimic this natural [thermoset elastomer] effect. These attempts have resulted in short lived activity and/or deleterious voltage effects . . . .".

A significant disadvantage of the elastomer is its procurement cost, currently 3 to 4 times higher than articles made for example from polyethylene and polyvinyl chloride plastics.

Another is that natural thermoset elastomer products can be inconsistent in their activity, as the chemical composition can vary in accordance with the natural variations that can occur during the growth cycle. Processing variations can also have an effect on the concentration of the unknown chemical components which may be the source of the activity.

OBJECTS OF THE INVENTION

It is a principal object of the invention to find a way to meet or exceed the benefits provided by natural elastomer obtained from *Hevea brasiliensis* trees, by artificial or synthetic means, thereby providing at least equivalent but preferably superior attenuation of Sb "poisoning" of the storage cell active surfaces, such as at the negative electrodes, superior attenuation of gassing, water consumption, self discharge and dendritic growth, elevation of top of charge potential as well as superior attenuation of cumulative destructive effects on the structure of the positive electrodes.

These objects of the present invention are achieved using a metal accumulation inhibiting supplement delivered by any one of multiple routes into an electrochemical energy storage cell, the supplement suitable for use in a chargeable electrochemical energy-storing cell, and suitable for use in a chargeable electrochemical energy-consuming cell, the cell containing an acidic electrolyte, at least one positive electrode and at least one negative electrode. The cell is adapted for receiving an electric current, the negative electrode being responsive to the electric current, having capacity to evolve gas and receive metal thereby. While the supplement can possibly be obtained as an isolate from the cis-polyisoprene thermoset elastomer obtained from *Hevea brasiliensis* trees, given the expense of this elastomer as a starting material, for economic, commercial and most practical purposes, the supplement is preferably a synthesized version of the active compounds as discussed further below, and additionally includes active analogues, derivatives and structurally similar chemical compounds. The term "isolate" or "isolated" are meant to include either isolated individual compounds or an isolated group of compounds such as may be obtained by extraction or other processing means from a natural material, as it may also be possible to obtain the supplement of the invention through isolation from various natural sources. The term "supplement," whenever referred to herein, will be understood as being an "isolated or synthesized supplement". The supplement is optionally (as there are other routes) mixable with a retaining medium to form a combination, the combination contactable with the electrolyte, the supplement modifying the electrolyte so as to acquire a foaming property which provides a visual confirmation that the supplement has additionally achieved a concentration sufficient to produce a consequent metal accumulation inhibiting effect, wherein the negative electrode, being responsive to the supplement, in operation, thereby accumulating a diminished quantity of metal thereby.

DETAILED DESCRIPTION OF THE INVENTION

As discussed above, the object of the invention is to provide a metal accumulation inhibiting supplement and a delivery system therefor which avoids the use of the natural elastomer of the prior art, but which performs at least equally thereto. Consequently, it was necessary to establish the properties of the natural elastomer for comparison.

Freshly tapped natural elastomer from the *Hevea brasiliensis* tree that is in regular, normal production is a colloidal suspension containing 30-35% solid material, consisting of mainly but not exclusively cis-polyisoprene. The solid material has been reported also to contain 2.4% neutral lipids, 1% mainly glycolipids and phospholipids, as well as smaller amounts of galactolipids and sphingolipids, 2.2% proteins, 0.4% carbohydrates, 0.2% ash and 0.1% other compounds. The relative concentrations vary, depending on the age and the clone of trees, soil, climate, tapping frequency, subsequent processing, etc.

After considerable study, it is believed that the portion that may be responsible for providing attenuation of Sb "poisoning" of the negative electrodes, attenuation of gassing, water consumption, self discharge and dendritic growth, elevation of the top of charge potential and attenuation of cumulative destructive effects on the structure of the positive electrodes, resides predominantly within the 1% glycolipids and phospholipids portion, more specifically, it is believed to be the phospholipid aspect of that portion.

Phospholipids are triglycerides with one of the fatty acid chains replaced by a phosphate-choline arrangement. The components of a phospholipid include a hydrophobic tail and a hydrophilic head. The hydrophobic tail consists of two fatty acid hydrocarbon chains. The hydrophilic head consists of a glycerol "backbone" near the middle, followed by phosphate and finally choline (occasionally ethanolamine) at the end.

Choline resembles a quaternary ammonium structure. It is cationic, meaning it carries a positive charge. The phosphate is anionic and carries a negative charge. In a biological environment, the phosphate predominates. In a strongly acidic electrolyte environment, the phosphate is effectively neutral and the positively charged quaternary ammonium aspect predominates.

Glycolipids resemble phospholipids, except that in the place of phosphate and choline, they a have sugar. The sugar aspect is able to gain a positive charge in an acidic electrolyte environment. A glycerophospholipid is a derivative of glycerophosphoric acid that contains at least one O-acyl, O-alkyl, or O-alk-1'-enyl residue attached to the glycerol moiety.

The glycolipid and phospholipid components that appear to migrate out of the elastomer into the electrolyte are believed to be attracted to the surfaces of solid objects, particularly metals, for example, the surfaces of negative electrodes. The phospholipid molecules, for example, present more or less cylindrically and are aligned with their heads closest to the surfaces and their tails jutting out mostly perpendicular to the surfaces. This aspect of quaternary ammonium behavior is well understood by surface treatment, personal care and disinfectant specialists. There is an equilibrium between migration into and out of the electrolyte and the concentration of the lipid components in the electrolyte remains relatively low, likely although not exclusively at about 1-2 parts per million. Concentrations of a few parts per million are believed to be highly effective, concentrations of the order of hundreds, thousands of parts per million and higher, are likely to be counterproductive.

The solubility of phospholipids released by the described elastomer was determined after a soaking of the elastomer in water, as being in excess of 5 parts per million, relative concentration, measured via the quaternary ammonium aspect using a water treatment spectrophotometer calibrated to cetrimonium chloride, (Hach model DR/2010—Test 401). N-alkyl dimethyl benzyl ammonium chloride, which closely resembles cetrimonium chloride, and phospholipids provide similar attenuation of dendritic growth on, and "poisoning" of the negative electrodes.

The use of and the behavior of n-alkyl dimethyl benzyl ammonium chloride in energy storage cells is described in U.S. Pat. No. 6,635,387 to Fitter et al, U.S. Pat. Nos. 6,821,681 and 6,899,978 to Fitter, and U.S. Pat. No. 7,147, 972 to Fitter et al, the entire contents of which are incorporated herein by reference. There is a tendency for the tail or hydrocarbon aspect of the molecules, which is hydrophobic, to attract and to retain a portion of the hydrogen gas given off by the negative electrodes of energy storage cells during charging, when the cells are near or at full state of charge.

Hydrogen gas bubbles emitted from the negative electrodes start off very tiny and can be under very high pressure, exceeding 30 atmospheres, due to surface tension in the water of the electrolyte. It has been worked out that a mat consisting of a layer of nanoscopically sized gas bubbles forms over the surfaces of the negative electrodes when the voltage impressed on the cell is above the gassing potential of the cell. The mat is porous to an extent that it forms a selective barrier—allowing hydrogen ions (donated by hydroniums) to pass and reach the negative electrodes, yet preventing a majority of much larger hydrated cations of Pb, Sb as well as others that may be present in the electrolyte from reaching the negative electrodes. This barrier appears to behave not unlike a reverse osmosis equipment membrane barrier. A surplus of gas may be generated and released, appearing in the form of normal charging bubbles.

The barrier increasingly impedes a higher flow rate of hydrogen ions, thus achieving a degree of self adjustment. The barrier is sparse to substantially absent when a voltage impressed on the energy storage cell is below the gassing potential of the cell and forms when a voltage impressed on the energy storage cell is sufficiently above the gassing potential of the cell.

It has been determined after careful study that industrially prepared, artificial and synthetic phospholipids are suitable for use as the metal accumulation inhibiting supplement of the invention, though phospholipids isolated from natural substances can also be used. In either case, the cost of the supplement of the invention is significantly less than the cost associated with the processed and cured form of a natural cis-polyisoprene thermoset elastomer obtained from *Hevea brasiliensis* trees.

N-alkyl dimethyl benzyl ammonium chloride can improve the service life expectancy of an energy storage cell significantly. Its barrier may not become effective, however, until a potential of at least roughly 2.45 volts is applied to the energy storage cell. The chloride counter ion concentration, while low, may be sufficient to interfere with the functioning of an energy storage cell and the ampere-hour capacity of the cell may be reduced by up to 3%. These characteristics, individually or in combination, have reportedly been considered to carry technical and perhaps commercial disadvantages.

Amphoterics including alkyl betaines and alkyl sultaines, which carry a positive and a negative charge of which the positive is quaternary ammonium, hence have no counter ions, appear to be less effective than might be expected. The positive and negative charges are accommodated in a reverse order in the molecules compared to phospholipids. Amphoterics with charges accommodated in the same order as phospholipids are satisfactory. Anionic surface actives, which carry a negative charge, appear to have limited effectiveness.

A typical, although not exclusive example of a suitable material or supplement is [alkyl poly(ethylene glycol) poly(propylene glycol)]. Its general molecular structure is $CH_3(CH_2)_x(OCH_2CH_2)_y(OCH_2CHCH_3)_zOH$, in which the x aspect is usually although not exclusively between 7 and 29, the y aspect is usually although not exclusively between 0 and 35 and the z aspect is usually although not exclusively between 0 and 10. This molecular structure is sometimes expressed differently, for example, $CH_3(CH_2)_mCH_2O(CH_2CH_2O)_n(CH_2CHCH_3O)_pH$. Substances comprising molecules that broadly resemble these general molecular structures, their homologs, the molecular structures of glycolipids and phospholipids, the molecular structures of quaternary ammoniums, as well as combinations thereof, are likely to be suitable for use in practicing the invention. Generally, the isolated or synthesized supplement corresponds to an ingredient of a latex obtained from a *Hevea brasiliensis* tree other than a polyisoprene ingredient. The isolated or synthesized supplement thus may be selected from a phospholipid, a fatty alcohol ethoxylate, a fatty alcohol alkoxylate, an alkyl glycerol phosphate choline, and combinations thereof, or may be a phospholipid having choline as a head group with glycerophosphoric acid, or a phospholipid having a choline as a head group with glycerophosphoric acid and having at least one saturated fatty acid and at least one unsaturated fatty acid. Effective isolated or synthesized supplements may include a C8-18 fatty alcohol having from six to thirty ethylene oxides, or, a C8-10 fatty alcohol having six ethylene oxides, or, may be a C16-18 fatty alcohol having thirty ethylene oxides. An effective supplement usable in the invention may be selected from number of compounds and substances, for example, from the group consisting of a phospholipid, a phospholipid having choline as a head group with glycerophosphoric acid, a fatty alcohol having eight or more carbons, a fatty alcohol having eight or more carbons with ethylene oxide, a fatty alcohol with eight or more carbons with ethylene oxide and propylene oxide, a fatty alcohol ethoxylate, a fatty alcohol alkoxylate, a fatty alcohol having six or more ethylene oxides, a C8-18 fatty alcohol having six to thirty ethylene oxides, a C16-18 fatty alcohol having thirty ethylene oxides, an ingredient of a latex obtained from a *Hevea brasiliensis* tree other than a polyisoprene ingredient, alkyl amphoterics accommodating electrical charges in a same sequence as phospholipids, and combinations thereof.

Specific examples, $[CH_3(CH_2)_{11}][(OCH_2CH_2)_6][OCH_2CHCH_3)_3]OH$ and $[CH_3(CH_2)_{15}][O(CH_2CH_2)_{30}]OH$, are satisfactory for use in the manufacture of articles for incorporation into storage cells as well as in electrolytes for achieving the metal accumulation inhibiting function of the invention. The numerical aspects designated above as x, y and z, are natural numbers likely to express an average value, that would typically be encountered in practice.

The positions of the polyethylene and polypropylene glycol groups may be reversed or alternated. Straight or branched alkyl phenol polyethylene/polypropylene glycols, long chain alkyl amines, alkyl amine ethylene and propylene glycols, alkyl ethoxylates, propoxylates, polysorbates and a variety of other similar complex hydrocarbons are suitable. Animal, plant, mineral oil or coal derived feedstocks may be used. Generally, a wide variety of $CH_3(CH_2)_xOH$, straight, branched, phenol-containing or similar molecules, that have been reacted at a temperature of approximately 150-200 degrees celcius at a moderately elevated pressure, with ethylene oxide and/or propylene oxide, in the presence of KOH or similar hydroxide, may be selected for use in the invention.

The —OH termination or polar aspect of the molecule of the preferred compound selected as the supplement acquires a positive charge at the low pH typical of the electrolyte, (~OH+H=-OH$_2$+). The ether or "O" linkages in glycol have an affinity for water. At low pH, for example although not exclusively pH 0.0, the hydrophilic portion of the purportedly nonionic supplement molecule resembles the positively charged head and hydrogen bonding neck aspect of a phospholipid molecule. The effectiveness of a typical single hydrocarbon chain arrangement of the molecule of the preferred material is, for practical purposes, commensurate with the double hydrocarbon chains of a phospholipid molecule. The degree of solubility of the supplement can be controlled during manufacture of the supplement by incorporating an appropriate number of —OH terminations, more preferably, ether linkages. The greater the number of ether or "O" linkages, for example, the better the aqueous solubility. Solubility in water, for these types of compounds, usually implies a comparable or better solubility in $H_2SO_4$ electrolyte. The supplement of the invention provides substantially the same desired functional advantages in an electrochemical cell as the migratory compounds of *Hevea brasiliensis* elastomer, the supplement similarly migrating into the acidic electrolyte. Theoretically, the supplement could be obtained as an isolate of *Hevea brasiliensis* elastomer, though it is preferably synthesized and obtained from commercial sources given the likely high expense in such an isolation process, while the active migratory compounds identified herein can be obtained from a variety of commercial sources.

The degree of solubility is conventionally described in terms of hydrophilic-lipophilic balance or HLB, which is usually expressed numerically, with 0 representing insoluble in water, soluble in oil, 10 representing equally soluble, 20 representing soluble in water, insoluble in oil. A supplement with an HLB number preferably below about 10 would be suitable for use in porous electrodes, in particular negative electrodes; while a supplement with an HLB number preferably above about 10 would be suitable for use in articles of plastic, containing plastic, similar to plastic and containers made of plastic, of energy storage cells. A supplement with an HLB number of, although not exclusively 12 to 18 would be suitable for use in the electrolyte, at least greater than 2, preferably 5 to 16, in the sheets that provide separation between the electrodes of energy storage cells and 2 to 10 in the porous electrodes.

There are a number of processes that may be used for combining a supplement of the invention with plastic for forming articles made of supplemented plastic, supplemented articles made of materials similar to plastic, articles containing supplemented plastic, supplemented plastic containers, supplemented porous electrodes and supplemented electrolytes for energy storage cells. The list may include but is not limited to the following.

Articles made of, similar to and containing supplemented plastic, for example made from a plastic selected from the group including but not limited to polyethylene, polypropylene, polyethylene-polypropylene copolymer, high density polyethylene, ultra high molecular weight polyethylene and polyvinylchloride plastic, the articles being injection molded, extruded, sintered, or rotation or blow molded, with the chosen plastic receiving the supplement at a preferred concentration by mixing the plastic with the supplement essentially in the same way as pigments are now being mixed with plastics prior to processing. The supplement is optionally incorporated into a carrier, thereby encapsulating the supplement, prior to mixing into the plastic. A number of encapsulating materials would be known to those skilled in the art. In one embodiment, the carrier may consist of a powdered material that may be blended with the supplement, with the carrier being compatible with the plastic to promote distribution in the plastic during processing, to protect the supplement during processing, or in another embodiment, to provide controlled release of the supplement from the article during use. The supplement-carrier combination may be incorporated in an article at a relatively high concentration, to account for attrition during processing of the plastic into the article. In another embodiment, the quantity and/or composition of the carrier may be chosen to effect a timed release of the supplement after the rechargeable electrochemical energy storage cell has entered service. The preferred directly combined plastic-supplement concentration is similar to the concentration routinely used for pigments. The processing temperature is most preferably below 230 degrees Celsius, preferably below 200 degrees Celsius, preferably not below 150 degrees, alternatively 280 degrees Celsius or less subject to heating being applied for a few tens of seconds.

A detailed description of an example that lends itself to this process is provided in U.S. Pat. No. 3,123,654 to Malischewski et al, the entire content of which is incorporated herein by reference. Another detailed description of an example that lends itself to this process is provided in U.S. Pat. No. 3,351,495 to Larsen et al, the entire content of which is incorporated herein by reference.

The encapsulated supplement is typically although not exclusively prepared by blending together requisite quantities of a suitable carrier and supplement into a uniform mixture, optionally with a suitable solvent which is driven off after the mixture has become uniform. Thereafter, the encapsulated supplement is processed to provide a powder, which may be washed with hot water, then dried and heated with hot air to provide a powder having particles with a heat glazed surface.

Supplemented articles made of, similar to and containing plastic, may be made for example from polyvinyl chloride that has been plasticized, or rendered as a dough, with the aid of a solvent instead of being heat softened. This is then extruded, receiving the supplement either in essentially the same way as pigments prior to processing, or receiving the supplement at a preferred concentration, pre-dissolved or suspended in the solvent. The processing temperature is at, but preferably below, the boiling point of water. A detailed description of an example that lends itself to this process is provided in U.S. Pat. No. 2,772,322 to Witt et al, the entire content of which is incorporated herein by reference. Another detailed description of an example that lends itself to this process is provided in U.S. Pat. No. 4,153,760 to Sundberg et al, the entire content of which is incorporated herein by reference.

Negative electrodes may receive the supplement as an accompaniment to expanders, at roughly comparable concentrations. Expanders preferably include lignin derivatives, finely divided C and $BaSO_4$. The various materials are mixed in a suitable apparatus. Alternatively, the supplement can be dissolved in a solvent and the solute applied to assembled electrodes and allowed to dry, prior to their incorporation into energy storage cells.

Supplemented plastic enclosures may incorporate the supplement as an accompaniment to, or an alternative to pigments that are conventionally included in, or added to the plastic material used to make the enclosures prior to injection molding, at roughly comparable concentrations. The injection molding process proceeds as normal.

A supplemented electrolyte could also be produced where an electrolyte receives the supplement directly or the supplement may be dissolved in the energy storage cell replenishment water, at suitable concentrations and dosed into the electrolyte at suitable intervals. The supplement is unlikely to accumulate to a high level of concentration as it is consumed not only by the negative electrodes but is oxidized by the positive electrodes.

A suitable quantity of the supplement of the invention may be incorporated into articles of plastic, as herein described. Optionally, in some circumstances where there is an alternative need to incorporate a quantity of *Hevea brasiliensis* elastomer or synthetic elastomer into an article, these may also be incorporated, together with the supplement, to provide a blend, thereby further enhancing the metal accumulation inhibiting and performance enhancing effect. In such a case, their individual distinguishing features may reliably be identified, for example although not exclusively, by hydrogen[1] and/or carbon[13] nuclear magnetic resonance (NMR) spectroscopy.

Formation of dendrites on and Sb "poisoning" of the negative electrodes are manifestations of electroplating. The mechanism at work is virtually identical to commercial electroplating via a predominantly acidic electrolyte used commercially to produce metal particulate. The deposition can be powdery, stringy, spongy, grainy and/or mossy. The solubility of Pb—Sb metal alloy comprising the positive electrode support structure in the electrolyte is very low but not zero. On application of a sufficient potential, some of the surface metal at the positive electrodes may be converted to oxide, and some, after donating electrons, gradually dissolves in the electrolyte, migrates as cations via the electrolyte to the negative electrodes, where the cations receive electrons and plate out as metal crystals. Accumulation of Sb on the negative electrodes increases gassing, increases water consumption, increases self discharge, lowers the top of charge potential. Metal cations are relatively heavy, causing progressively more metal to be deposited towards the bottom of the negative electrodes. Portions of the metal that arrive at the negatives can become dislodged, to form a precipitate.

Electroplating in rechargeable electrochemical energy storage cells is undesirable, yet unavoidable. From a casual perspective it appears to be almost imperceptible, hence is often overlooked. It is an accompaniment to on-charge gas evolution at the negative electrodes. It requires application of a potential sufficient to initiate and to sustain electroplating. A typical energy storage cell with $PbO_2$—Pb electrodes and $H_2SO_4$ electrolyte experiences insignificant gas evolution below an applied potential of 2.25 volts, provided the negative electrodes are relatively free of Sb, near-zero electroplating and visible gas evolution at 2.35 volts, modest although eventually destructive electroplating and voluminous gas evolution at 2.65 volts, both rising progressively from 2.35 to 2.65 volts. A 1.6913 volts segment of the potential developed by this type of cell is a characteristic specific to the electrochemical potential of $PbO_2$ of the positive electrodes.

The presence of a metal accumulation inhibiting supplement of the invention in the electrochemical cell of the invention eventuates in a portion of the supplement migrating towards the cell surfaces, particularly to the surface of the negative electrodes. This portion is able to accept gas when it is evolving from the negative electrodes, eventuating in turn, in the formation of the barrier of the invention at the surface of the negative electrodes. Gas evolving from any Sb that may be present on the negative electrodes can also promote formation of the barrier. Not all of the cell potential contributes to activation of the barrier of the invention. Activation is provided by a 2.25 (total cell volts)–1.6913 ($PbO_2$ volts)=0.5587 volts segment. Activation of the barrier relates to electrochemical activity at the negative electrodes, not to activity at the positive electrodes. Electroplating relates to electrochemical activity at the positive as well as at the negative electrodes. The supplement of the invention is effective for preserving a variety of metals that may be used in the construction of energy storage cells, possessing broadly similar electrochemical and gassing potentials, including but not limited to Pb, Sb, Sn, Cd and Cu. The supplement of the invention and described method of application thereof is suitable for use in electroplating cells of a type in which one of these metals are employed.

A presence of a sufficient quantity of the supplement of the invention at the surface of negative electrodes can be confirmed by a palpable elevated potential of the negative electrode of a fully charged energy storage cell on application of an equalizing-strength constant current charge, compared to a negative electrode of an equivalent fully charged energy storage cell that is not equipped with a supplement of the invention.

It has been found that the presence of an active amount of the supplement of the invention in an electrolyte that is in use in an energy storage cell may be evidenced by a foam, that develops and persists, following suitable agitation of a portion of the electrolyte or in any other suitable fluid that accommodates the supplement, at a suitable temperature, within an enclosure holding at least ten times greater volume of air, at preferably 80 to 105 kPa atmospheric pressure and at temperatures in the range of about 10 to 100 degrees Celsius, with the electrolyte preferably still and not boiling prior to shaking. It should be noted that dilute $H_2SO_4$ (1.250 sg) boils at around 109.2 degrees Celsius at NTP. A presence of electrodes in energy storage cells progressively depletes the electrolyte of supplement. Hence, accumulation of supplement is typically facilitated by a separation from or a withdrawal of the electrodes for a suitable period of time ahead of the described procedure. Presence of the supplement of the invention in negative electrodes may be ascertained by removal of all positive electrodes a suitable period of time ahead of the evaluation procedure, thereafter evidenced by a foam, evoked by shaking, generally according to the method described above.

It has been found that, without any foam inducing property, there can be no metal accumulation inhibition. Foaming is believed to demonstrate an ability of the supplement molecules to interact with gases, and so is evidence of the presence of supplement in an active concentration but foaming per se contributes nothing to the effect. Even barely perceptible foaming is a useful indicator of activity.

Preparation of a sufficient quantity of electrolyte containing the metal accumulation inhibiting supplement of the invention for use in a chargeable electrochemical energy consuming cell of the invention is now described. In particular, in cell 14 described hereunder, there is first an extraction of an approximately 100 cubic centimeter external dimensionally sized portion of a supplement-incorporating aspect intended for use or for incorporation in an energy storage cell of the invention, cleaning to remove superficial dirt and drying, and then dividing the extracted portion into suitable fragments, roughly 10 millimeters or less in size, placing the dry fragments in a 1.5 to 2 liter glass or inert plastic bottle and adding 150 milliliters conventional strength energy storage cell $H_2SO_4$ electrolyte, for example 1.250 SG. Effective treatment of the electrolyte of the invention requires soaking for a period of time and occasional agitation. The bottle is closed and stored at about 30 to 40 degrees Celsius. The bottle is shaken vigorously up and down vertically by hand for about 10 seconds once a day. By repeating a sufficient number of days, (rarely more than 7 days), the shaking produces foam on the surface of the electrolyte, the foaming increasing progressively with each successive shaking preferably until the foam persists preferably for up to 5 seconds, most preferably 5 to 10 seconds, however preferably not much longer than 10 seconds and most preferably not 3 minutes or longer, upon conclusion of shaking. (If the foam lasts 3-5 minutes, the concentration of the supplement is likely in the order of 10 to 100 times above a working optimum. A satisfactory concentration of supplement in electrolyte is in the order of 1-2 parts per million. Dilution using plain electrolyte can be an appropriate remedy for an excessive concentration. Alternatively, the liquid portion can be discarded and the soaking repeated briefly.) This represents a fair simulation of the transfer of supplement into an electrolyte in a conventional vehicle-powering energy storage cell situation. Foaming is generally not perceptible in energy storage cells due to adsorption at the negative electrodes and oxidization at the positive electrodes of foam generating constituents of the supplement as and when these are released, thereby providing foam attenuation. Adsorption is likely to be limited, oxidation is likely to be ongoing. Separation from these electrodes facilitates foam generation.

Large rechargeable electrochemical energy storage cells connected in series used to power indoor and outdoor vehicles are charged via ferro-resonant or high reactance transformers and rectifiers, silicon controlled rectifiers or high frequency transistor power converters, that deliver current that is prevented from rising destructively when the cells are fully discharged, yet continues to flow when they approach full state of charge. This is achieved by current control. It is feasible for chargers to supply a tapering current towards the end of charge but more preferable to supply a controlled constant current finishing rate for a suitable period of time following commencement of gassing at a per-cell potential of 2.35 volts. Gas evolution is accompanied by electroplating. This aspect of operation and means for assessing the extent of electroplating is realistically exemplified by the apparatus described hereunder.

Commercial energy storage cells are made with electrode assemblies that are confined to a minimum practicable volume, are constructed of materials that are subject to unpredictable shedding of particulate from negative and positive electrodes, making it extremely difficult to reliably assess the before-and-after-mass of the negative electrodes and to distinguish negative from positive precipitate at a deposition site. The manner of cell construction necessitates tear-down for evaluation purposes. This is both an unsuitable form of construction and a disruptive process that renders accurate evaluation of the effectiveness of the apparatus of the invention highly unlikely. Cells for evaluation must, out of practical necessity, be purpose crafted.

Figure 1:
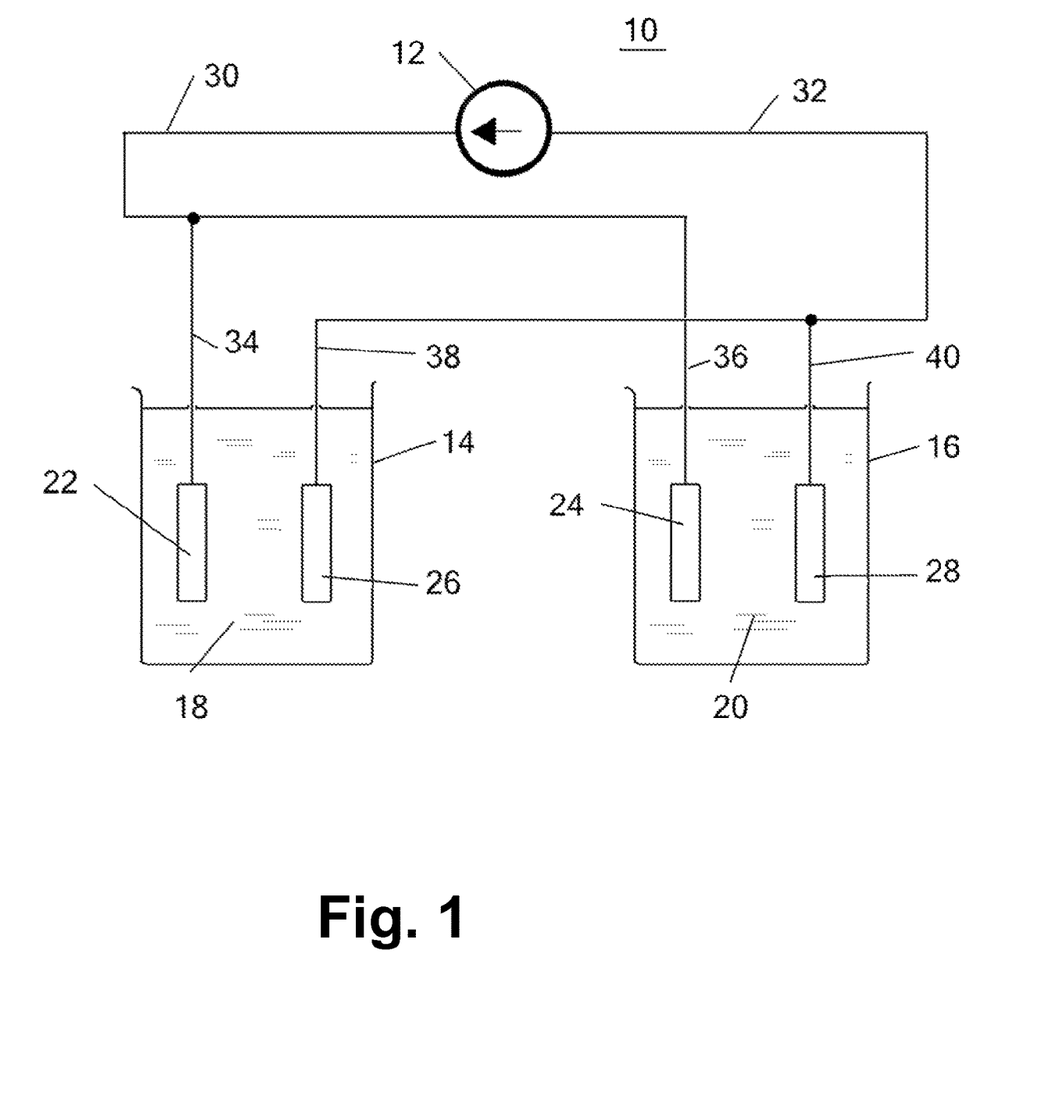
FIG. 1 is a schematic drawing showing two adjacent energy storage cells, connected electrically in parallel, in which a first cell represents a treated cell of the invention and a second cell represents a control cell, and a suitable electrical constant current power source.

Referring to FIG. 1, this shows an electrical schematic representation of an electrochemical apparatus 10, analogous to rechargeable electrochemical energy storage cells connected to a charging apparatus, comprising a constant current source 12, typically an electronic regulated laboratory bench power supply adjusted to deliver a stabilized 50 milliamps of current at a potential typically, although not exclusively, not exceeding 10 volts, a first cell 14 and a second cell 16. Cell 14 contains electrolyte 18 having a dispensed volume of 100 milliliters and cell 16 contains electrolyte 20 having a dispensed volume of 100 milliliters. The dispensed volumes may be any volume between 100 and 125 milliliters, provided cells 14 and 16 receive substantially identical volumes of electrolytes 18 and 20. The electrolytes 18 and 20 being conventional energy storage cell $H_2SO_4$ electrolyte procured from the same source container. Cell 14 contains a positive electrode 22 and cell 16 contains a substantially identical positive electrode 24, electrodes 22 and 24 being electrically connected to each other via conductor 34 and conductor 36. Cell 14 contains a negative electrode 26, or treatment electrode, and cell 16 contains a substantially identical negative electrode 28, or control electrode, electrodes 26 and 28 being electrically connected to each other via conductor 38 and conductor 40. Electrodes 22 and 26 being submerged in electrolyte 18 and electrodes 24 and 28 being submerged in electrolyte 20 during operation of the electroplating apparatus 10. The submerged portions of paired electrodes 22 and 26 and paired electrodes 24 and 28 are positioned substantially symmetrically and are separated substantially equally by at least 18 millimeters at their closest approach to practically and effectively equalize electric fields. The construction of cells 14 and 16 generally corresponds to the layout shown in the schematic representation.

The electrodes 26 and 28 are conveniently and preferably each constructed to submerge a 40 millimeter length of 97% Sn wire, 2 millimeters diameter, of a type commonly used by plumbers for soldering, in its associated electrolyte. The electrodes 22 and 24 can be constructed of other metals, including Cd, Cu, Pb and Sb, singly or in combination. Sn wire is preferred for use as negative electrode material because its surface has a bright metallic luster which does not tarnish in air and because at −0.1375V, it more closely resembles the electrochemical potential of Pb at −0.1262 volts than any other metal. Electrodes 26 and 28 being washed in acetone and buffed with regular tissue paper before incorporation into cells 14 and 16.

The power source 12 provides an electric current flow in conductors 30 and 32 that remains substantially constant at 50 milliamps. The value of the delivered current may be any value within 5% of 50 milliamps that is held substantially constant. The current flowing in conductor 34 plus the current flowing in conductor 36 equals the current flowing in conductor 30. Similarly, the current flowing in conductor 38 plus the current flowing in conductor 40 equals the current flowing in conductor 32. The voltage appearing across conductors 34 and 38 equals the voltage appearing across conductors 36 and 40 at all times. Cell 14 and cell 16 are therefore subjected to identical electrical potential at all times. This circuit arrangement is an electrochemical derivative of a "long-tailed pair" amplifier circuit, British Patent 482,740, to Blumlein (1936).

Current delivery by the constant current source 12 is inhibited until cell 14 has received the full amount of 100 milliliters of electrolyte 18 and cell 16 has received the full amount of 100 milliliters of electrolyte 20. The cells 14 and 16 receive their total volumes of electrolyte by simultaneous pouring by hand. The electrolytes 18 and 20 originate from the same container. The electrolyte 18 of Example 1 is procured by drawing a first volume of 150 milliliters from the container then prepared in accordance with the extraction, soaking and foam testing procedure described above, thereafter a 100 milliliter volume of treated electrolyte being removed from the bottle and placed in cell 14, to become electrolyte 18. A second volume of 100 milliliters of electrolyte is drawn from the container and placed directly in cell 16, to become electrolyte 20. Electrolytes 18 and 20 are at substantially identical temperatures at commencement of operation of the electroplating apparatus 10. The constant current source 12 is switched on within a few tens of seconds after cells 14 and 16 received electrolytes 18 and 20.

Example 1

Electrodes 22 and 24 were each constructed of 500 millimeter lengths of the same type of Sn wire as the negative electrodes 26 and 28, suitably coiled to save space. The electrolyte 18 procured and prepared in accordance with the extraction, soaking and foam testing procedure described above and consequently including supplement from a suitable supplement-containing sample. Cell 14 received a 100 milliliter portion of this electrolyte which was originally drawn from the container and cell 18 received 100 milliliters of electrolyte drawn directly from the container. After five hours at 50 milliamps, electrode 26 had received a transparent haze of grayish metal and electrode 28 had accumulated a pine tree shaped tangled growth of metal crystals.

Example 2

The electrodes 22 and 24 were each constructed of coils of Sn wire, substantially identical to the electrodes 22 and 24 per Example 1. Preparation of the electrolytes 18 and 20 for use in this example produced and prepared in accordance with the extraction, soaking and foam testing procedure employed for Example 1, except, instead of a supplement-containing sample, high porosity insulating sheet containing *Hevea brasiliensis* natural elastomer of the type used to provide separation between energy storage cell electrodes was extracted, soaked, foamed and the electrolyte therefrom used. After five hours at 50 milliamps, electrode 26 had received a transparent haze of grayish metal and electrode 28 had accumulated a pine tree shaped growth of metal crystals.

Example 3

The electrodes 22 and 24 were each constructed using 5 grams of Sb metal powder lightly compacted into a small finely woven polyester fabric cylindrical holder, the holder previously fitted with a full length and base width inboard strip conductor made of pure Pb. The Pb conductor of electrode 22 connected to conductor 34 and the Pb conductor of electrode 24 connected to conductor 38. The supplement was prepared by dissolving 0.5 milliliters of $[CH_3(CH_2)_x][(OCH_2CH_2)_6][(OCH_2CHCH_3)_3]OH$, (x ranging from 7 to 15 and including isomers), in 99 milliliters of water, then transferring a 1 milliliter portion thereof into cell 14. Cell 16 received 1 milliliter of plain water. Electrolytes 18 and 20 were poured into cells 14 and 16 thereafter. The electrolyte 18 supplement concentration estimated at 50 vol parts per million. After five hours at 50 milliamps, electrode 26 acquired a barely perceptible coating, and retained most of its original bright Sn metallic luster, while electrode 28 acquired a thin, opaque, dark colored coating, typical of Sb and deposited a small quantity of sediment of the same color at the foot of the electrode.

After 10 hours at 50 milliamps, electrolyte 18 received a quantity of supplement equal in volume and concentration to the original quantity that had been provided and electrolyte 20 received an equivalent volume of water, to compensate for oxidization of supplement due to the high surface area of the positive electrode 22. (The electrolytes of commercial energy storage cells may similarly receive a suitable quantity of the supplement when cells are filled, formed, readied for shipment or during their regular operation.) After one week at 50 milliamps, electrode 26 bore a perceptible coating yet retained some evidence of luster, while electrode 28 had deposited a significant volume of dark sediment at the foot of the electrode. The electrode 24 holder, which originally contained 5 grams of Sb powder, retained about one third of the original amount of Sb powder. The electrode 22 holder retained almost the entire original amount of Sb powder. The difference is very obvious.

The procedure was concluded one week after commencement. The use of a constant current source rather than a constant voltage source accommodates a potential across the cells 14 and 16 that stabilizes at a natural value of the cells. Upon disconnection of the current source 12, the potential across conductors 30 and 32 did not fall to zero. The cells 14 and 16 supported electrical potential across conductors 30 and 32 characteristic of $PbO_2$—$Pb$—$H_2SO_4$ energy storage cells, although exhibiting limited storage capacity and relatively high rate of self-discharge, nevertheless amply demonstrating that the mechanisms behind electrochemical energy storage and electroplating technologies overlap significantly.

Example 4

The electrodes 22 and 24 were each constructed of coils of Sn wire, substantially identical to the electrodes 22 and 24 of Example 1. Preparation of the electrolytes 18 and 20 for use in this example was substantially identical to the preparation of the electrolytes 18 and 20 of Example 3, with exception of the supplement concentration in electrolyte 18, which was reduced to an estimated concentration of 1 vol part per million, achieved by an appropriate additional intermediate dilution. After 5 hours at 50 milliamps, electrode 26 had received a transparent haze of grayish metal and electrode 28 had accumulated a pine tree shaped growth of metal crystals.

The Pb strip conductors of Example 3 acquired a characteristic dark brown patina of $PbO_2$ within a few tens of minutes after the current source 12 began delivering current, thereby effectively becoming the working positive electrodes of cells 14 and 16, contributing a 1.6913 volts portion towards the total potential across cells 14 and 16. The Sn-positive, Sn-negative electrode arrangement of Examples 1, 2 and 4 developed potentials across cells 14 and 16 that were commensurately less than in Example 3, at 50 milliamps, by an amount approximating 1.6913 volts.

Figure 2:
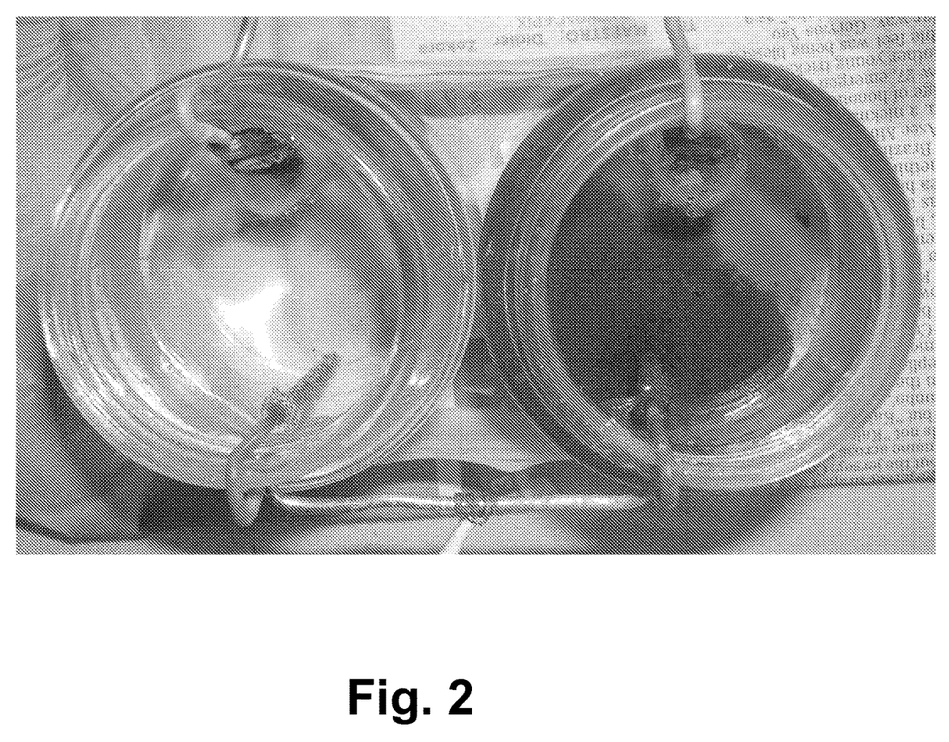
FIG. 2 is an image taken of a testing apparatus following the procedure of Example 3, at the end of one week.
Figure 3:
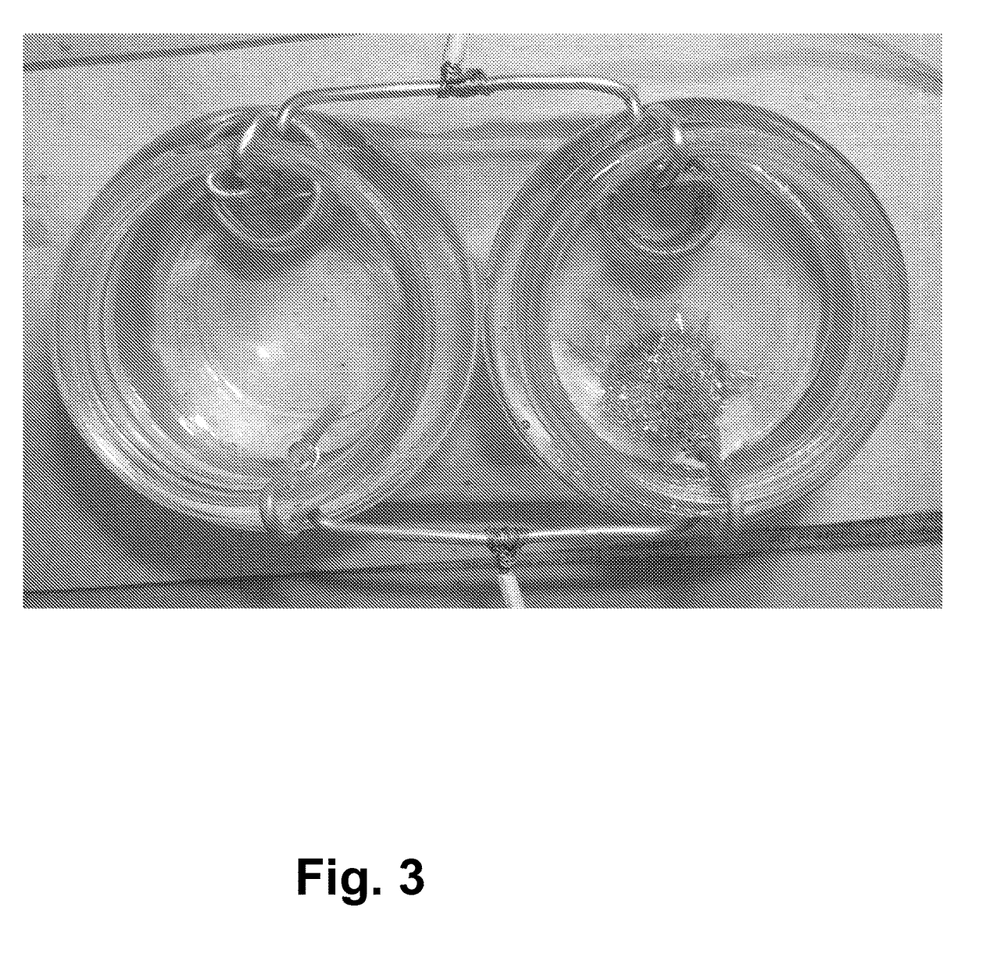
FIG. 3 is an image was taken of the apparatus while following the procedure of Example 4 after 5 hours.
Figure 4:
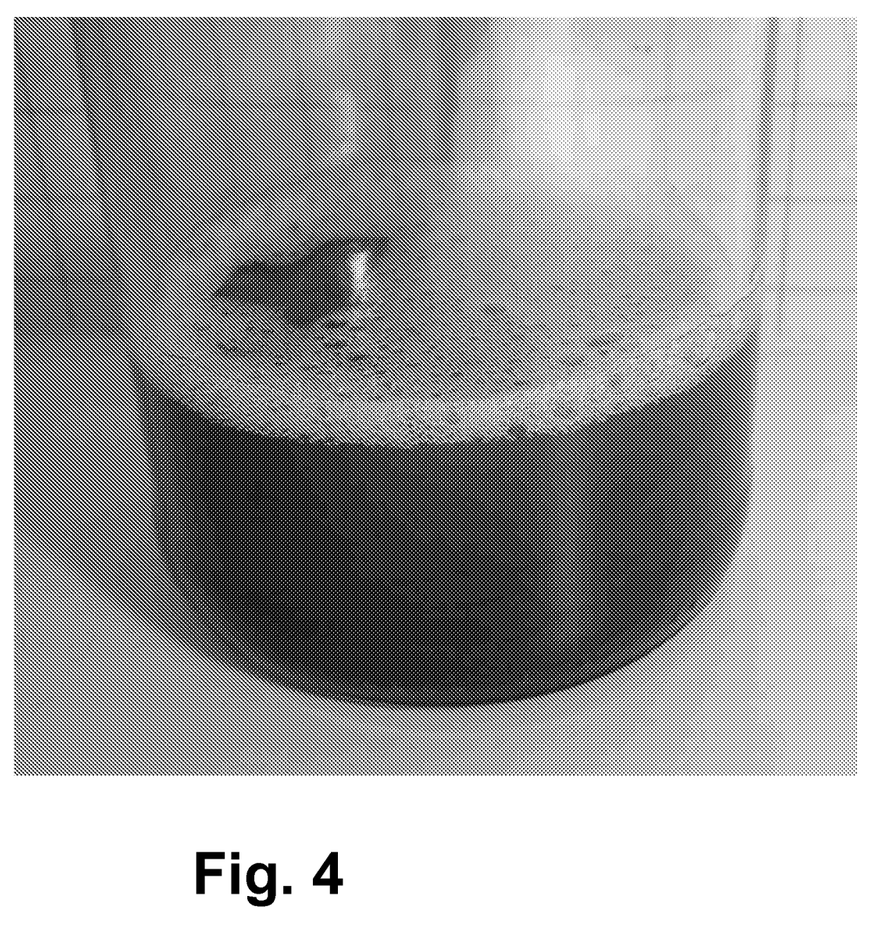
FIG. 4 is an image which illustrates a foaming action.

Referring to FIGS. 2 and 3, these are images which show a treatment cell on the left, and a control cell on the right. FIG. 2 is an image taken of the apparatus while following the procedure of Example 3, at the end of one week. FIG. 3 is an image taken of the apparatus while following the procedure of Example 4 after 5 hours. Examples 1 and 2 gave virtually identical results to Example 4, that is, the degree of metal accumulation was virtually identical at the end of the experiment. Sn is very soluble in acidic electrolyte while Sb is not, which is believed to be why in Example 4, the results were obtained after only 5 hours, while for Example 3, the results were obtained after one week. These images show quite clearly the significant metal accumulation inhibiting effect using the supplement of the invention. FIG. 4 is an image which illustrates a foaming action.

Examples 1, 2, 3 and 4 provide accurate replication of the type of electroplating that occurs during operation of $Pb$—$PbO_2$—$H_2SO_4$ energy storage cells, and accurate replication of facility or capacity of the apparatus of the invention to attenuate metal deposition on negative electrodes of such energy storage cells, typically Sb and thereby reducing Sb "poisoning". The extent of the reduction in metal deposition on the negative electrodes through electroplating provided by the apparatus of the invention defined as mass attracted to the control electrode divided by mass attracted to the treatment electrode, typically though not exclusively equating to at least 1.05, preferably 1.1, more preferably 2 and most preferably by at least 10 or more.

An article made of plastic, specifically polyvinyl chloride (PVC), was prepared with a synthesized supplement to produce a supplemented plastic article. A sample was washed repeatedly in water then immersed in an electrolyte, which when shaken, displayed foaming, following the procedures outlined above, to indicate the presence of the supplement in the electrolyte, which compared to the foaming typical of a high porosity insulating sheet made from a natural thermoset elastomer. When the sample was placed in an electrochemical cell, the cell was found to operate with the same operating advantages as those obtained with a comparable high porosity insulating sheet made from a natural thermoset elastomer, thus establishing the usefulness of the invention in creating various cell components out of supplemented plastic, with advantages comparable to the natural thermoset elastomer but without the cost and consistency problems associated therewith. While PVC is described, the above would be applicable to a variety of plastics, and PVC was chosen for illustrative purposes, the invention not being limited to use with PVC.

One such article which can incorporate the supplement of the invention is the porous insulator typically disposed between the positive and negative electrodes of an electrochemical cell. These are structures which are ionically porous but are made of a dielectric material so as to prevent short circuiting between the electrodes.

Figure 5:
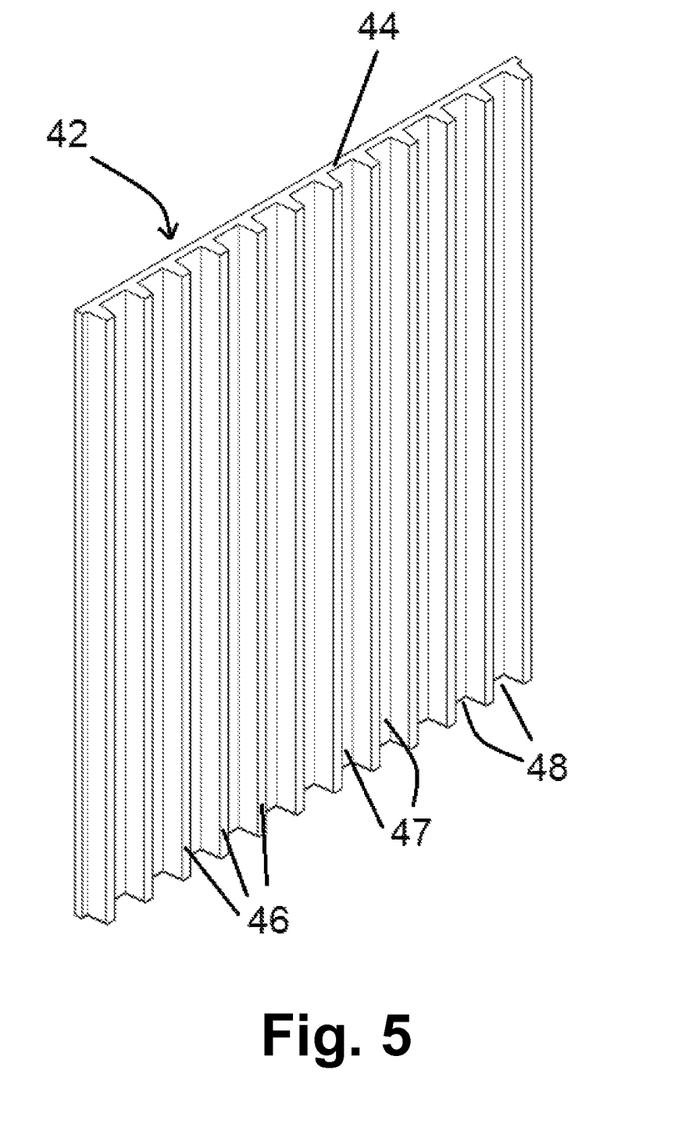
FIG. 5 is a perspective drawing showing a ribbed high porosity insulating sheet designed to provide separation between energy storage cell electrodes, of a type suitable for accommodating the supplement of the invention; and, FIG. 6 is a plan view showing a portion of the ribbed high porosity insulating sheet of FIG. 5, with an adhering glass fiber mat, providing separation between a negative and a positive electrode of an energy storage cell.

FIG. 5 shows an example of one such insulator. There are of course numerous other designs, which can also benefit from the invention, this one being exemplary of the group. FIG. 5 shows a single ribbed high porosity insulating sheet 42 which provides separation between the negative and positive electrodes of a rechargeable electrochemical energy storage cell. The sheet 42 consists of a planar backweb 44 typically although not exclusively being about 0.2 to 0.5 millimeters thick. The ribs 46 extend outwardly from a surface 47, typically protruding by about 0.2 to 3.0 millimeters. The ribs 46 may be about 0.5 to 1.5 millimeters thick. The high porosity insulating sheet 42 is permeable to the electrolyte of the rechargeable electrochemical energy storage cell.

The preferred orientation of the sheet is with the ribs 46 vertical, so that the ribs form channels 48 that allow the electrolyte to circulate, and also allow any gas generated to escape upwardly during charging. Similarly, any particulate that forms can slide down off the surface of the sheet 42. The width and length of the insulator typically slightly exceeds the width and length of the electrodes, to provide full coverage therebetween, with the backweb 44 usually arranged close to the negative electrode and the ribs directed towards the positive electrode.

The high porosity insulating sheet may be made of a polymeric material, optionally include silica, and, in accordance with the present invention, further incorporate an effective amount of the supplement of the invention therein.

Figure 6:
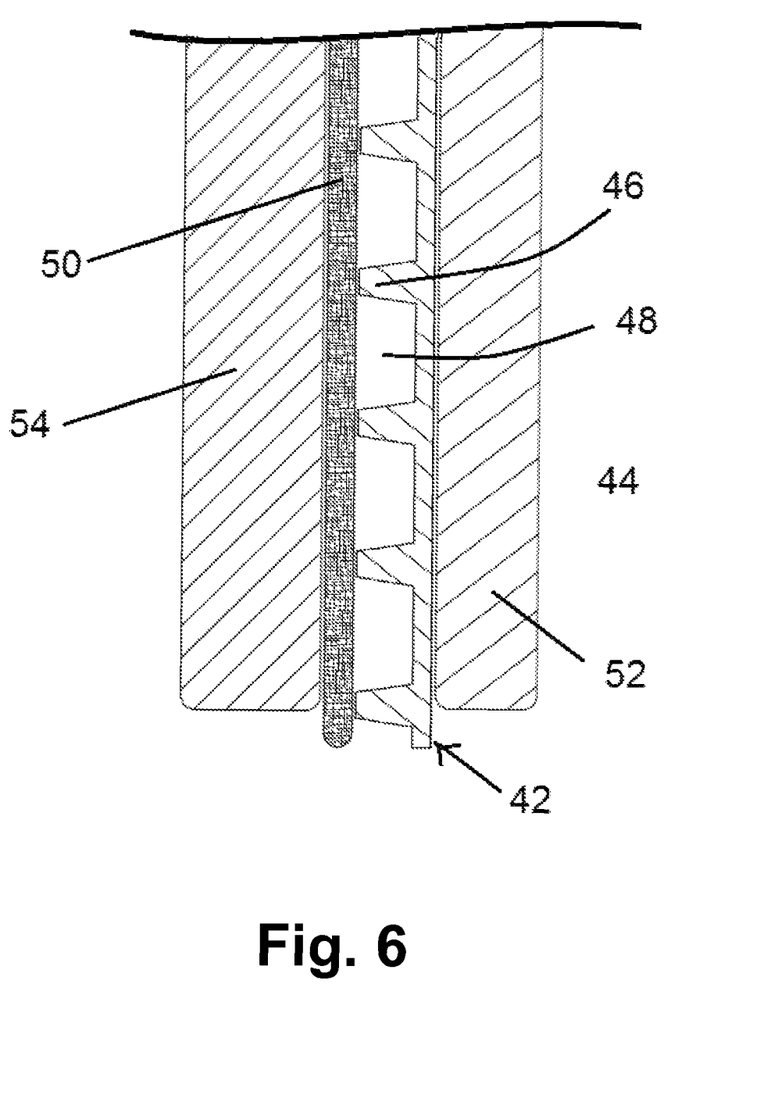

FIG. 6 shows a plan view of a portion of an assembly that includes the ribbed high porosity insulating sheet 42. A fiber mat 50 made from glass or polyester fibers abuts the tips of the ribs 46, and may be bonded thereto. The backweb 44 is contiguous with a negative electrode 52 and the mat 50 is contiguous with a positive electrode 54. While an actual electrochemical cell may include other optional components such as envelopes, tubes, gauntlets and spacers, these are not shown for ease of illustration.

The assembly is submerged in an electrolyte to form a rechargeable electrochemical energy storage cell. Of course, a rechargeable electrochemical energy storage cell typically includes multiple assemblies, with each successive electrode having at least one adjacent insulating sheet 42 and fiber mat 50, alternating positive and negative electrodes thereby being interspaced by an insulating sheet 42 and fiber mat 50. Again, only one is shown for ease of illustration.

The backweb 44, which is contiguous with the negative electrode 52, is relatively distant from the positive electrode 54 to promote migration of the supplement contained in the insulating sheet 42, via the electrolyte, towards the negative electrode 52. Dendrites can form in a prior art rechargeable electrochemical energy storage cell, which consist of metal that originates in the positive electrode 54, that slowly electroplates onto the surface of the negative electrode 54. Over the service life of the cell, these dendrites form slender spines that eventually penetrate the pores of the insulating sheet 42 and extend into the channels 48. While the dendrite portions that reach into the channels 48 usually break off and fall down harmlessly into a sediment trap at the bottom of the cell, preventing short circuits from forming between the negative and positive electrodes, shorting can eventually occur. It has been found that the presence of the supplement in the insulating sheet significantly attenuates formation of dendrites, by inhibiting a release of metal from the positive electrode, thereby delaying the onset of shorting.

The fiber mat 50 is arranged to reduce shedding of active material from the positive electrode 54. Active material particulate that inadvertently penetrates the fiber mat 50 during the lifetime of the cell can enter the channels 48 and then fall down harmlessly into the sediment trap at the bottom of the cell (not shown).

In the case where the porous insulating sheet is composed of PVC, it may be advantageous to pre-combine some of the supplement with PVC plastic to provide a material that is easily blended with bulk PVC powder prior to processing into the insulating sheet. This eases handling, and assures compatibility and distribution during processing. For example, the supplement may be dissolved in a solvent along with a quantity of PVC, in a range of from 2-30% by weight, the concentration may depend on the choice of supplement, desired amount in final product, etc. One example may be about 25%. The solvent is removed and the product ground and classified to produce a desired particle size. The powder is washed thoroughly, dried and optionally, heated to firm the surfaces of the particles. The particles are optionally washed again, and dried to provide the supplement encapsulated in PCV. This material can then be blended with the bulk PVC material destined to be processed into the insulating sheet at various desired concentrations, and the blended material then used for example as an extrusion mixture and fed to an extruder for producing the insulator sheet according to known manufacturing steps, thereby creating an insulating sheet that contains the supplement in a form suitable for controlled release when placed into use in a rechargeable electrochemical storage cell.

Of course, plastics other than PVC may be used, and for example may be selected from among polyethylene, polypropylene, polyolefin, polystyrene, polyvinyl chloride (PVC), phenolic resins, and combinations thereof.

It may be advantageous to combine a suitable quantity of supplement with a suitable quantity of polymeric material to provide a pre-combined material that is conveniently blended with a bulk polymeric material prior to processing into the insulating sheet. This eases handling, permits the use of different types of pre-combined and bulk polymeric materials and minimizes inadvertent loss of supplement during any post processing, such as a post-extrusion solvent extraction process. For example, the supplement may be directly combined with a quantity of polyvinyl chloride, polyethylene, polypropylene or any other suitable polymeric material, heated until sufficiently softened or melted, blended and thereafter cooled.

Another example would have the supplement dissolved in a pre-combination solvent along with a quantity of polyvinyl chloride, polyethylene, polypropylene or other suitable polymeric material at a temperature approaching or at the boiling point of the pre-combination solvent, then heating to remove substantially all of the pre-combination solvent and thereafter cooled. A variety of pre-combination solvents with moderately high boiling points are suitable, for example although not limited to, cyclohexanone and decalin. The quantity of supplement in the pre-combined material may be in a range of 1-40% by weight. One example may be 15%.

The pre-combined material is ground to a powder and classified to produce a desired particle size. The classified powder is optionally processed by washing in, for example although not limited to, hot water or a water-solvent mixture, to deplete the surface regions of the classified powder particulate of supplement, while retaining the bulk of the supplement within, thereby providing supplement encapsulated in polymeric material. This pre-combined material is blended with the bulk polymeric material as well as additional requisite materials of an extrusion or sintering process, destined for processing into the insulating sheet, at various desired concentrations. The extrusion process or sintering process proceeds in accordance with, for example although not limited to, known manufacturing steps, thereby creating an insulating sheet that contains the supplement in a form suitable for controlled release when placed in a rechargeable electrochemical energy storage cell.

The described embodiments of the invention are to be considered in all respects as illustrative and not restrictive. The invention is particularly described in the appended claims and all changes that can be made which come within the meaning, equivalency, scope and spirit of the invention are intended to be embraced therein.

The invention claimed is:

1. A porous insulating sheet for use between a pair of electrodes of a rechargeable electrochemical energy storage cell, the porous insulating sheet consisting of:
   a polymeric insulating sheet-forming material formed into the porous insulating sheet; and
   an isolated supplement;
   the isolated supplement consisting of compounds isolated by extracting a portion of a material obtained from a natural source;
   the isolated supplement not including any compounds obtained by extracting a portion of a cured *Hevea brasiliensis* elastomer;
   the isolated supplement including a phospholipid having choline as a head group with glycerophosphoric acid;
   the quantity of the isolated supplement included in the porous insulating sheet being an effective treatment quantity;
   the effective treatment quantity being a sufficient quantity of the isolated supplement to produce a foam, as demonstrated when a portion of the porous insulating sheet is placed in an $H_2SO_4$ electrolyte and, upon placing of the portion of the porous insulating sheet therein, is soaked for a period of time of less than one week therein, and is agitated by shaking in the $H_2SO_4$ electrolyte under an atmospheric pressure between 80 and 105 kPa, and at a temperature between 10 degrees and 100 degrees Celsius, the foam so produced confirming the inclusion and presence therewith of the effective treatment quantity of the isolated supplement; and wherein performance of the electrochemical cell is enhanced by the porous insulating sheet including the isolated supplement; and the performance enhancement of the electrochemical cell includes a reduced metal accumulation on a negative electrode of the electrochemical cell or a palpable elevated electric potential of the negative electrode of the electrochemical cell, or both, when the porous insulating sheet is placed in and used in the electrochemical cell and when compared to performance of the electrochemical cell adapted for use without the porous insulating sheet placed therein nor used therein, or when compared to an electrochemical cell adapted for use as a control cell and that is equivalent to the electrochemical cell except that the porous insulating sheet is not placed therein nor used therein.

2. The porous insulating sheet of claim 1, wherein the polymeric insulating sheet-forming material is selected from the group consisting of polyethylene, polypropylene, polyolefin, polystyrene, polyvinyl chloride (PVC), phenolic resins, and combinations thereof.

3. The porous insulating sheet of claim 2, wherein the polyolefin comprises an ultra high molecular weight polyethylene.

4. The porous insulating sheet of claim 1, wherein the polymeric insulating sheet-forming material is primarily plastic.

* * * * *